United States Patent [19]

Hunt

[11] Patent Number: 5,029,904
[45] Date of Patent: Jul. 9, 1991

[54] QUICK CONNECTING COUPLING

[76] Inventor: Alexander C. Hunt, 220 W. Prairie St., Vicksburg, Mich. 49097

[21] Appl. No.: 296,080

[22] Filed: Jan. 12, 1989

[51] Int. Cl.⁵ .............................................. F16L 35/00
[52] U.S. Cl. ...................................... 285/24; 285/314; 285/319; 285/924; 285/906
[58] Field of Search ................. 285/18, 314, 315, 305, 285/308, 309, 921, 924, 377, 376, 401, 34, 395, 359, 24, 319, 906

[56] References Cited

U.S. PATENT DOCUMENTS

| | | | |
|---|---|---|---|
| 807,417 | 12/1905 | Caskey | 285/377 |
| 1,033,187 | 7/1912 | Metzger | 285/376 |
| 2,244,939 | 6/1941 | Carlson | 285/924 |
| 2,260,500 | 10/1941 | Wylie | 285/924 |
| 3,227,380 | 1/1966 | Pinkston | 285/376 |
| 3,635,501 | 1/1972 | Thomsen | 285/34 |
| 4,275,907 | 6/1981 | Hunt | 285/18 |
| 4,577,894 | 3/1986 | Wake | 285/295 |

Primary Examiner—Dave W. Arola

[57] ABSTRACT

A coupling device for fluid conduits comprising a tubular male member and female sleeve member, each having a hose end and a coupling end, the coupling ends being adapted to couple the members to form a fluid-tight joint, a shoulder on the male member intermediate its ends, the members having aurbaces for positioning the same with the bores thereof in communication and substantial axial alignment, latching members on the sleeve member comprising a plurality of flexible fingers having radially inwardly directed lips, and cam lock comprising a lock ring positioned around the outer surface of the latching member and moveable rotationally and axially thereof through rotational force applied thereto into and out of a position wherein said lips are forced and maintained in position for a locking relationship with said shoulder, said cam lock further comprising cooperating helical cams on said latching member and said lock ring.

7 Claims, 2 Drawing Sheets

QUICK CONNECTING COUPLING

This invention relates to fluid carrying conduit couplings, and, more particularly, to quick connectable couplings which, where desired, are readily manually separable.

In the art of quick disconnect couplings, a typical type is described in Applicant's prior patent, U.S. Pat. No. 4,275,907. The present coupling is somewhat similar, however, as will hereinafter become evident, the present invention gives a stronger fluid-tight joint having improved safety features and providing, in a preferred embodiment, relative rotatability of the coupling halves to prevent or alleviate hose kinking and offer a relief means for predetermined excessive pressure.

In accordance with the present invention there is provided a coupling device for fluid conduits comprising a tubular male member and female sleeve member, each having a hose end and a coupling end, said coupling ends being adapted to couple said members to form a water-tight joint, shoulder means on said male members intermediate its ends, said members having means for positioning the same with the bores thereof in communication and substantial axial alignment, latching means on said female sleeve member comprising a plurality of flexible finger means having radially inwardly directed lip means, and cam lock means comprising lock ring means positioned around the outer surface of said latching means and moveable rotationally and axially thereof through rotational force applied thereto into and out of a position wherein said lip means are forced and maintained in positive locking relationship with said shoulder means, said cam lock means further comprising cooperating helical cam means on said members.

In certain preferred embodiments of the present invention:
the helical cam means has a lock position; and
the latching means and lock ring means have cooperating detent means to prevent accidental movement of the lock ring means from its locked position and so positioned as to cause a positive "Lock-Up" of the male and female members when the coupling is pressurized.

This invention will be further understood from the following description and drawing wherein.

Figures 1, 2:
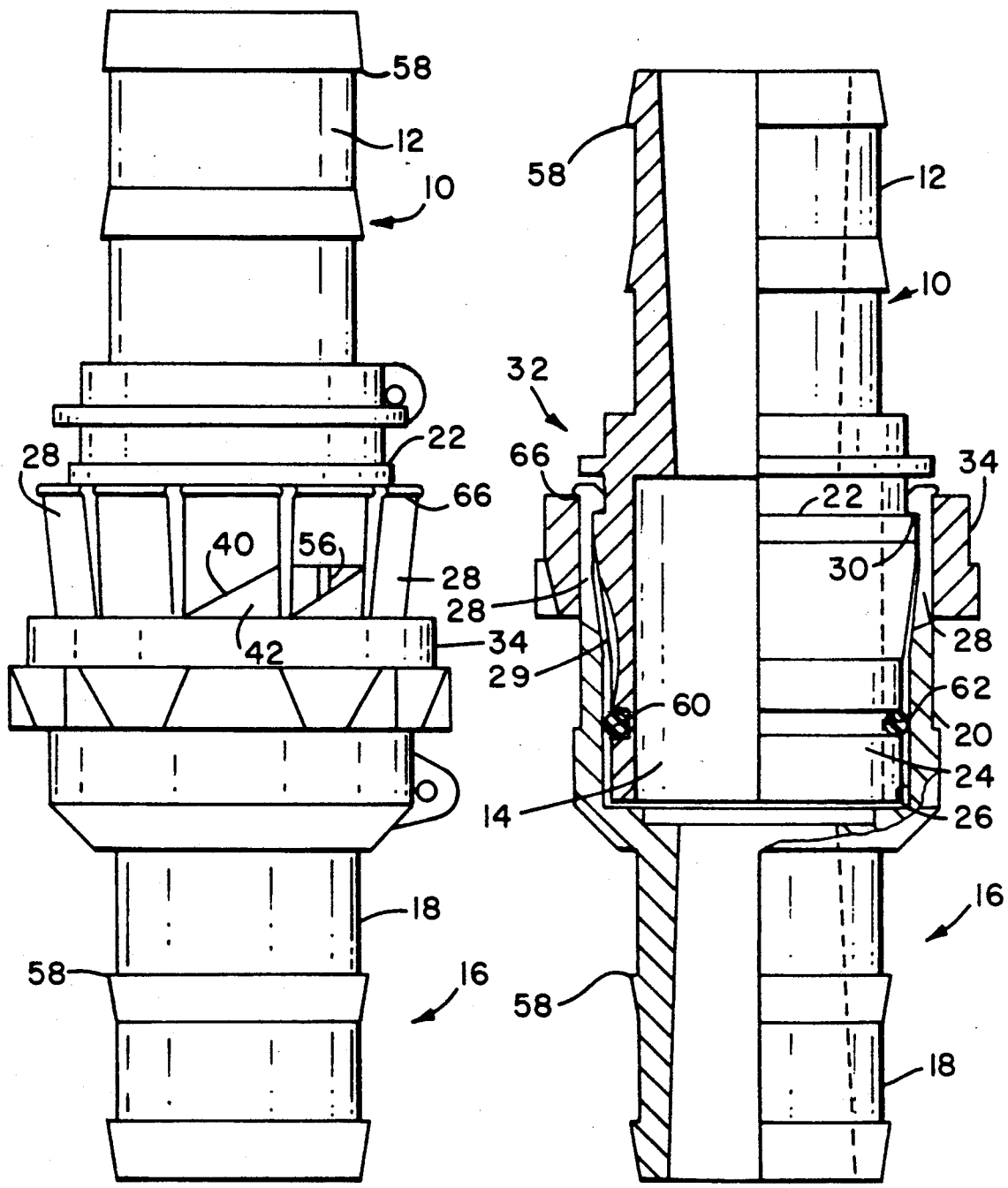
FIG. 1 is a side view of the present coupling in unlocked condition.
FIG. 2 is a longitudinal, partially cross-sectional view, of the coupling of FIG. 1 in assembled and locked condition.

Referring to the drawings, the present coupling device comprises a tubular male member 10 having a hose end 12 and a coupling end 14, and a female sleeve member 16 having a hose end 18 and a coupling end 20, the coupling ends being adapted to couple the members to form a water-tight joint as herein-after described. These members 10 and 16 are preferably of engineering grade, molded polymeric material such as polyethylene Nylon or the like. The male member is provided with a radially inwardly directed annular shoulder means 22. The members have alignment means comprising surface 24 of the male member and surface 26 of the sleeve member for positioning the members with their bores in communication and substantial axial alignment. A latching means is provided on the sleeve member comprising a plurality of flexible fingers 28 biased normally radially outward of said shoulder means 22 and having radially inwardly directed lip means 30 which are forced behind the shoulder means by cam lock means 32 when the members are assembled in coupled position. The cam lock means comprises a lock ring 34 adapted to be positioned around the outer surface of the fingers and being rotatable to thereby be moved axially thereof through the action of helical cam means described below, into and out of a position wherein the lip means 30 are forced and maintained in positive locking relationship behind the shoulder means 22. The cam lock means further comprises cooperating helical cam means, preferably two follower surfaces 36 and 38 formed by raised surface portions 44 equidistantly circumferentially spaced on the inner surface of lock ring 34, and two cooperating cam or ramp surfaces 40 formed by raised surface portions 42 equidistantly circumferentially spaced on the outer surface of the finger portion of sleeve member 16. These raised portions are of sufficient thickness, e.g., between about 1/16 to about 3/16 inches, to provide proper surface contact of the follower surfaces and the ramp surfaces for smooth movement of the lock ring 34. Also provided by raised portions 44 are lock or neutral motion surfaces 48 and 50, and stops 52 respectively. Nibs 54 and 56, one of which may be a detent, are provided on surfaces 68 and 42 respectively, for a purpose described further below. The lock ring 34 may be of the same material as the coupling, or of metal, or may be reinforced with an encircling band, for example, of stainless steel.

In further detail, threads may be provided on the hose end of either or both members in conventional fashion, or other means may be provided for connection to hoses such as, for example, the ridges 58 which insure proper hose gripping upon clamping of the hose therero. An O-ring 60 positioned in annular groove 62 of surface 24 provides a fluid tight seal against the mating alignment surface 26 of sleeve. Surface 26 is preferably slightly bevelled inwardly in a cone like manner as shown in order to maximize the sealing effectiveness of the O-ring as the members are axially forced together. It is noted that the O-ring seal allows the members to rotate substantially freely relative to each other such that in the coupling embodiment shown in the drawings the rotation is effective to prevent or relieve any hose kinking.

In another preferred embodiment, one or more elongated, generally axially directed slots 29, typically about 1/32 to about ¼ inch wide and approximately of the depth and configuration shown in FIG. 2, of any desired number spaced around surface 24, is provided such that if predetermined excessive pressure exists such as to deform the O-ring 60, by-pass or blow-by of fluid between the fingers will occur and allow the O-ring to settle properly back into its groove when the excessive pressure is relieved. In this manner the integrity of the O-ring is preserved as well as other portions of the coupling which might otherwise break or become permanently distorted. In cooperation with slots 29, the O-ring 60 is preferably dimensioned such that at a predetermined pressure, it will distort sufficiently to allow the aforesaid blow-by to occur without total disruption of the O-ring configuration.

The present cam operated lock ring 34 is dimensioned such that its radially innermost internal raised surfaces 44 can be forced slidably and axially over the outer surfaces 27 of fingers 28 to their shoulders 66 in an interference or tight fit. In order to do this, cam slots 68 delineated in the internal surface of the lock ring by raised portions 44 accommodate the said raised portions 42 on the outer surface of the sleeve member and fingers which provide the cam or ramp surfaces 40 which surfaces 36 and 38 follow during rotative motion of the lock ring. The ramp or raised surfaces of each member are preferably offset 180° from each other and are shaped such that rotation of the ring in a counter clockwise direction with reference to the drawing relative to the sleeve member 16 will move the ring toward the shoulders 66 of the fingers. It is particularly noted that the outer end 70 of each raised portion 44 terminates a sufficient distance from shoulders 66 in order to allow the lock ring to be rotated to a position where follower surfaces 36 and 38 are not engaged with ramps 40, and where the ring is in a locked or neutral position with respect to any camming force, i.e., wherein axially directed force on the ring will not cause it to move down the ramps 40 and loosen the grip of the fingers on shoulder 22. In this neutral position, the ring is substantially abutting shoulders 66 on the finger ends and portions 74 of the raised surfaces 44 are substantially wedged between shoulders 66 and ends 70 of the raised portions 42. This structural feature provides a measure of safety not heretofore available, in preventing accidental release of the lock ring. It is particularly noted that this camming mechanism allows an operator to exert compression forces on the ends of the fingers maintaining lips 30 in locking relationship behind shoulder 22 of a magnitude heretofore impossible to achieve by straight axial hand-locking motion of the lock ring. The ramps and follower surfaces may be interchanged, as a matter of choice, on the fingers and lock ring.

Figure 3:
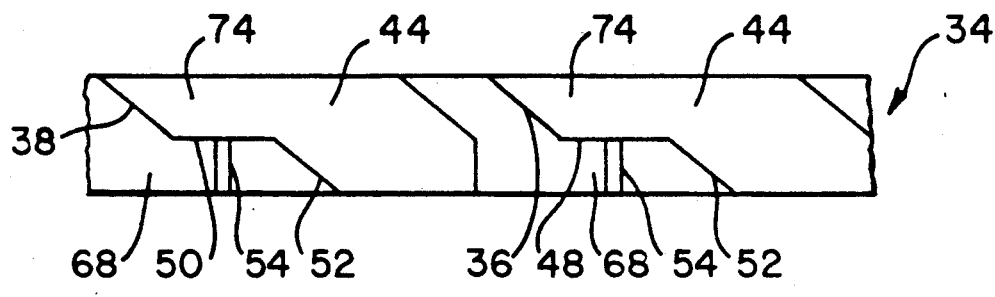
FIG. 3 is a rolled out plan view of the cam surface of the lock ring.
Figure 4:
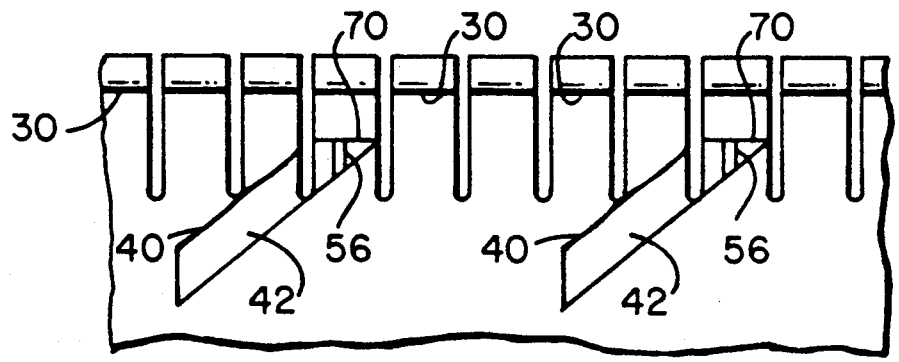
FIG. 4 is a rolled out plan view of the cam surface of the fingers.
Figure 5:
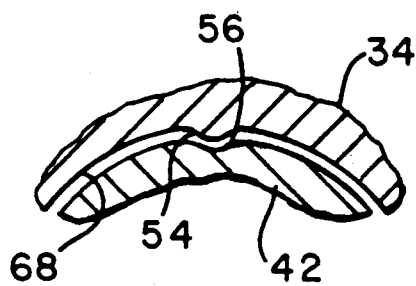
FIG. 5 is a cross-sectional view showing an embodiment of the detent structure.
Figure 6:
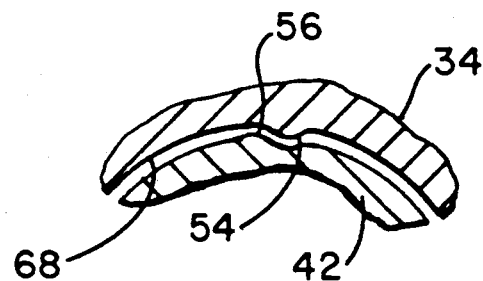
FIG. 6 is a cross-sectional view showing an alternative embodiment of the detent structure.

In addition to these novel and important features of the lock ring structure, a unique detent mechanism is provided to prevent accidental rotative motion of the lock ring after it has been rotated to the aforesaid locked or neutral position. This detent mechanism comprises nibs 54 and 56 such as shown in FIGS. 3, 4 and 5. The shape of the nibs and their positions on the lock ring and sleeve member may be widely varied, the important aspect thereof being that as the lock ring is rotated at least well into its locked or neutral position, the nibs will snap over each other and provide a measurable resistance to rotation of the lock ring back out of its locked position. The height and configuration of 54 and 56 will determine the degree of this resistance and one skilled in the art can readily select the configurations best suited to his objectives. In this regard, the nibs on one of either the ring or the sleeve may actually be a detent groove. Alternative constructions of such configurations are shown in FIGS. 5 and 6, in exaggeratedly thickened and spaced relationship for purposes of clarity, wherein the elongated nib 54 and nib or detent groove 56, e.g., 0.25 inch long, are provided on the adjacent arcuate surfaces of the ring and fingers. With this particular construction, it has been found that the locking function is enhanced as line pressure increases, in that radial expansion of member 10 will more forcibly maintain the detent elements in tight contact, especially where the lock ring is made of an essentially non-expandable material such as stainless steel or the like.

The invention has been described in detail with particular reference to preferred embodiments thereof, but it will be understood that variations and modifications will be effected within the spirit and scope of the invention.

I claim:

1. A coupling device for fluid conduits comprising a tubular male member and female sleeve member, each having longitudinal axis, a hose end and a coupling end, said coupling ends being adapted to couple said members to form a water-tight joint, shoulder means on said male member intermediate its ends, said members having means for positioning said male and female members with the bores thereof in communication and in substantial axial alignment, latching means on said female sleeve member comprising a plurality of flexible finger means having radially inwardly directed lip means, and cam lock means comprising lock ring means positioned around the outer surface of said latching means and moveable rotationally and axially substantially the entire length thereof through rotational force applied thereto into and out of a position wherein said lip means are forced and maintained in positive locking relationship with said shoulder means, said cam lock means comprising cooperating helical cam means on said latching means and said lock ring means for direct said rotational and axial movement, said helical cam means having a lock or neutral position wherein axially directed forces on said members cannot cause said lock ring to move.

2. The device of claim 1 wherein the members have cooperating detent means to prevent accidental movement of the lock ring from its lock position, so positioned as to cause a further lock-up of the coupling when it is pressurized.

3. The device of claim 2 wherein the detent means is provided on adjacent surfaces of said latching means and ring means members.

4. The device of claim 1 wherein a circumferential sealing surface is provided on the bore wall of said sleeve member, and a cooperating circumferential sealing surface is provided on the outer wall of said male member, said sealing surfaces being adapted to contact each other when said members are assembled and provide a fluid-tight seal therebetween.

5. The device of claim 4 wherein at least one of said sealing surfaces has a taper relative to the longitudinal axis for generating magnified sealing pressure as said members are axially assembled.

6. The device of claim 5 wherein at least one of said sealing surfaces is an O-ring.

7. The device of claim 6 wherein at least one longitudinally extending slot is provided in said outer wall of said male member, said slot beginning immediately adjacent said O-ring and extending to at least the spaces between said finger means to provide excessive pressure blow-by means.

* * * * *